Sept. 22, 1931.  K. B. NEU  1,824,743
PISTON PIN TOOL
Filed Nov. 25, 1929
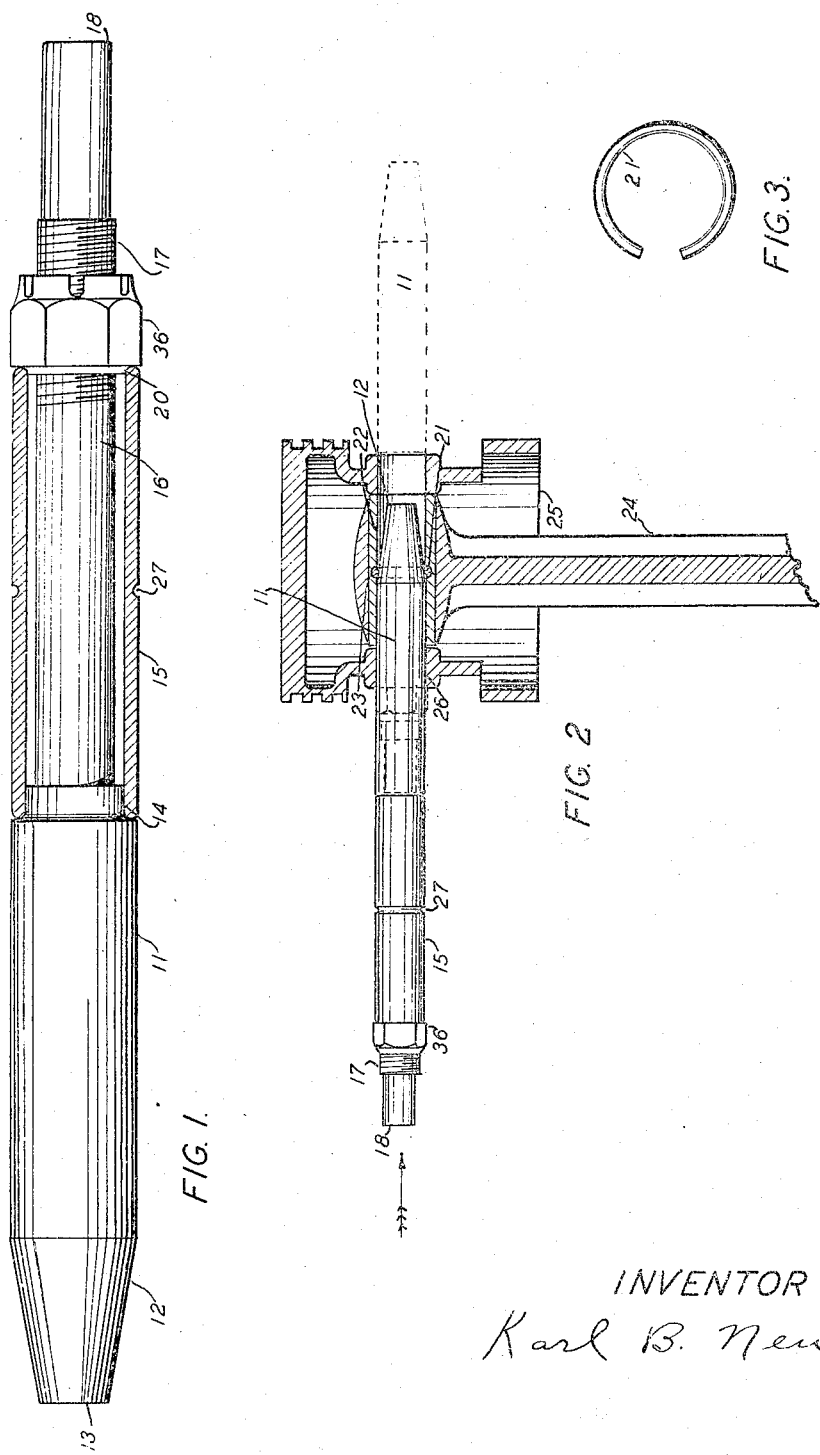
INVENTOR
Karl B. Neu Patented Sept. 22, 1931

1,824,743

UNITED STATES PATENT OFFICE

KARL B. NEU, OF ALHAMBRA, CALIFORNIA

PISTON PIN TOOL

Application filed November 25, 1929. Serial No. 409,574.

My invention relates to an improved tool for inserting and removing piston pins, or wrist pins as they are sometimes called, from pistons. With the advance in the art of internal combustion engines, and the refinements incident thereto, the nonferrous composition piston has come into extended use. It is well known that the co-efficient of expansion of the metal of these pistons (usually an alloy containing aluminum) differs from that of iron and steel. Consequently, when inserting a piston pin into one of these pistons where a tight fit is desired the piston is heated to a point somewhat hotter than its working temperature, a pin is used of a size to make a driving fit into the bearings of the heated piston and the pin driven in place before the piston cools. One of the objects of my invention is to provide a tool whereby piston pins may be efficiently driven into place in heated pistons and removed therefrom without damaging either the piston or the pin.

A further refinement in internal combustion engines, particularly those used in automotive and aircraft construction takes the form of a floating piston pin, which is a pin journaled in both the connecting rod and piston. These floating piston pins are held in place by snap or spring retaining rings usually either at the two ends of the pin or more commonly centrally located within the connecting rod bearing and surrounding a groove in the piston pin. A second object applies particularly to construction of the type last mentioned, in that I provide a tool for efficiently inserting the pin by expanding the retaining ring, holding the pin in place while the ring is expanded and driving it into locking position. A further object of my invention is to provide a means for easy withdrawal of the tool after the pin is locked in position, and lastly, to provide an efficient means for removal of all types of floating piston pins.

I obtain these objects by the device illustrated in the accompanying drawings, in which—

Figure 1 is an elevation view of my device with the piston pin in section; Figure 2 illustrates the device in use and inserted into a piston and connecting rod, these being shown in section. Figure 3 is an elevational side view of a type of retaining ring to be expanded by the device.

Similar numerals refer to similar parts throughout the several views.

In its present and preferred form all parts of the tool are made of a good grade of tool steel. Referring particularly to Figure 1, the numeral 11 represents the body of the device, which is cylindrical in shape and tapers at the one end to form the expansion taper 12, terminating in a driving head 13. The body 11 is made slightly smaller than the piston and connecting rod bearing in which it is to be used, and has a length somewhat greater than the piston pin to be inserted. At the end opposite the driving head the body is grooved annularly to form a shoulder 14 approximating the size of the interior hole in piston pin 15. The inner corner 16 of this shoulder is rounded to aid in centering piston pins that have a somewhat larger hole than the outside diameter of the shoulder 14. The remainder of the tool is turned to a smaller diameter than this shoulder and forms the stem 16 which is provided with threads 17 toward its outer end and is then reduced in size slightly to form the driving toe 18. The piston pin 15 is held in place centered on the stem by the retaining nut 36 which has, in its preferred form, an annular groove 20 cut similar to the groove forming shoulder 14. This aids in centering the pin.

In the operation of inserting a piston pin the spring retaining ring 21 is inserted in the connecting rod bearing 22, (see Figure 2) where it expands slightly in the interior annular groove 23 therein. The connecting rod 24 is then placed in position within the piston which has been heated, if necessary, and the head and body of the tool inserted in piston bearing 26, as shown in Figure 2. The taper head of the tool is then forced in the direction of the arrow by driving with a hammer or striking the assembly on a bumping plate. The ring 21 is thus further expanded over 11 the body of the tool, and onto piston pin 15, which is forced to follow thru by reason of the retaining action of nut 36. The tool together with the pin is forced thru the piston bearing until the body reaches the position indicated by the dotted outline 11. The pin should then be centered, by counter driving, if necessary, at which position the ring 21 will snap into 27, the central retaining groove on the pin. The nut 36 is then loosened and removed and the tool withdrawn.

In removing a piston pin the cycle of operations is reversed. The tool is first inserted, the nut 16 locked on, and the tool driven thru in a direction opposite to the arrow.

Having fully described the device and its method of use in inserting and removing piston pins I wish to be limited only by the following claims.

I claim:—

1. An article of manufacture comprising a cylindrical body having a tapered portion at one end terminating in a flat driving head, an annular shoulder at the opposite end and a stem of smaller diameter extending therefrom ending in a driving toe, and threaded retaining means on the outer portion of said stem adapted to retain a piston pin upon said stem, substantially as described.

2. A tool for inserting piston pins into pistons and connecting rods, comprising a cylindrical body portion having one end angularly tapered and terminating in a driving head, and at the other end, a shoulder of reduced diameter adapted to receive and center a hollow piston pin, and a cylindrical axially extending stem having a threaded outer portion adapted to receive a retaining nut and ending in a driving toe, in combination with a threaded retaining nut operative upon the threaded portion of said stem and having a shoulder on its inner face adapted to center and retain a piston pin upon said stem, substantially as described.

3. The method of inserting a piston pin into a piston and connecting rod bearing by first placing a spring retaining ring within an annular groove in the connecting rod bearing, second aligning the connecting rod bearing with the piston bearings within the piston, third forcing said ring into expanded position by a cylindrical tool having a tapering head and lastly forcing the piston pin to immediately follow the said cylindrical portion of said tool into said bearing, substantially as described.

4. A tool for inserting piston pins which comprises a pilot portion, a body portion of substantially the same outer diameter as said pin, a shank portion adapted to extend through the opening in said pin, a threaded portion beyond said shank portion, a clamping nut on said threaded portion, and a driving portion extending outward beyond said nut when the nut is in clamping position.

5. A tool for inserting piston pins which comprises a pilot portion, a body portion of substantially the same outer diameter as said pin, a shank portion adapted to extend loosely through the opening in said pin, a threaded portion beyond said shank portion, a clamping nut on said threaded portion, and an unthreaded driving portion extending outward beyond said nut when the nut is in clamping position.

6. A tool for inserting piston pins which comprises a pilot portion, a body portion of substantially the same outer diameter as said pin, a shank portion adapted to extend loosely through the opening in said pin, a threaded portion beyond said shank portion, a clamping nut on said threaded portion, and an unthreaded driving portion extending outward beyond said nut when the nut is in clamping position, in which means is provided for centering said pin on said tool independently of the size or concentricity of the axial opening in said pin.

7. A tool for inserting piston pins which comprises a pilot portion, a body portion of substantially the same diameter as said pin, a shank portion adapted to extend loosely through the opening in said pin, a threaded portion beyond said shank portion, a clamping nut on said threaded portion, and an unthreaded driving portion extending outward beyond said nut when the nut is in clamping position, in which the clamping nut has a substantially conical pin-engaging face by which one end of said pin is centered.

KARL B. NEU.